July 3, 1956          R. E. HAIRY          2,753,423
ARC SUPPRESSORS FOR ELECTRIC SWITCHGEAR
Filed March 25, 1952          3 Sheets-Sheet 1
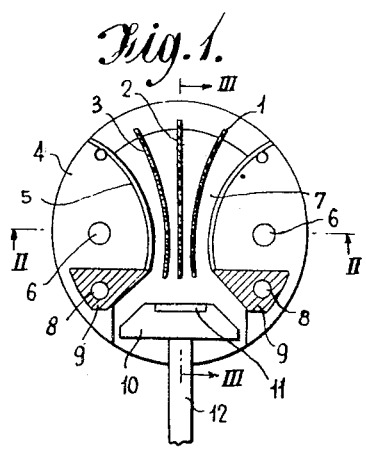
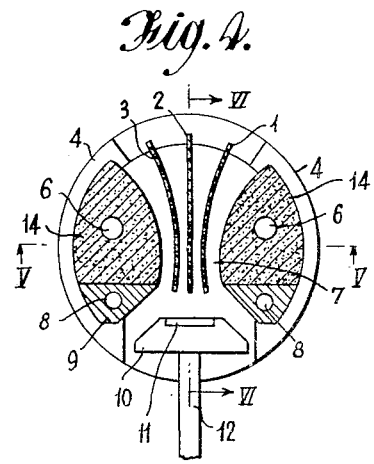
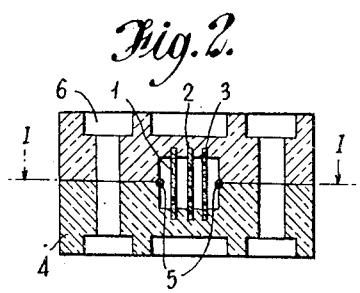
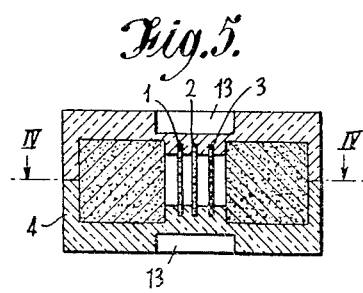
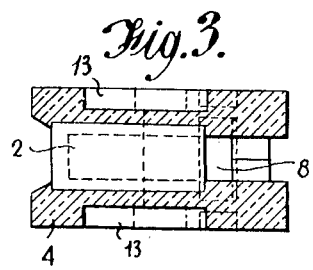
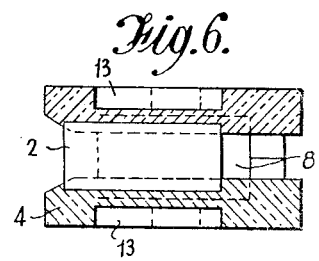
Inventor
RENE EUGENE HAIRY,
By
Stone, Boyden & Track
Attorneys.

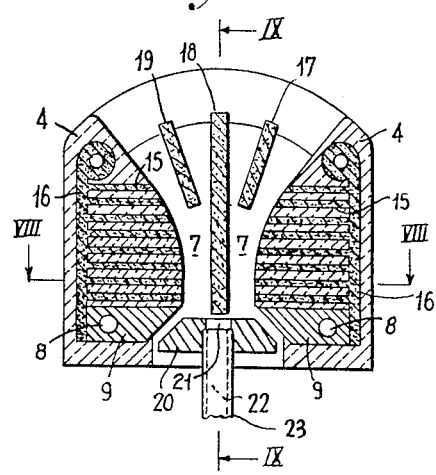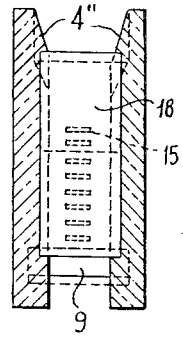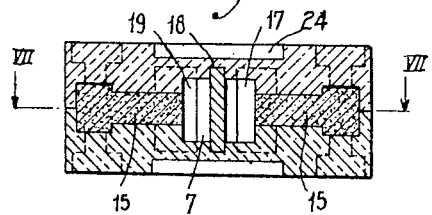

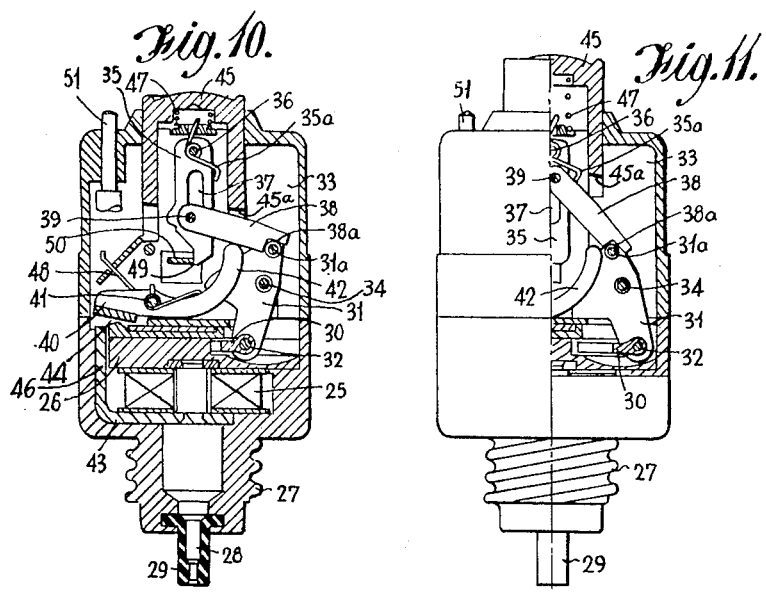
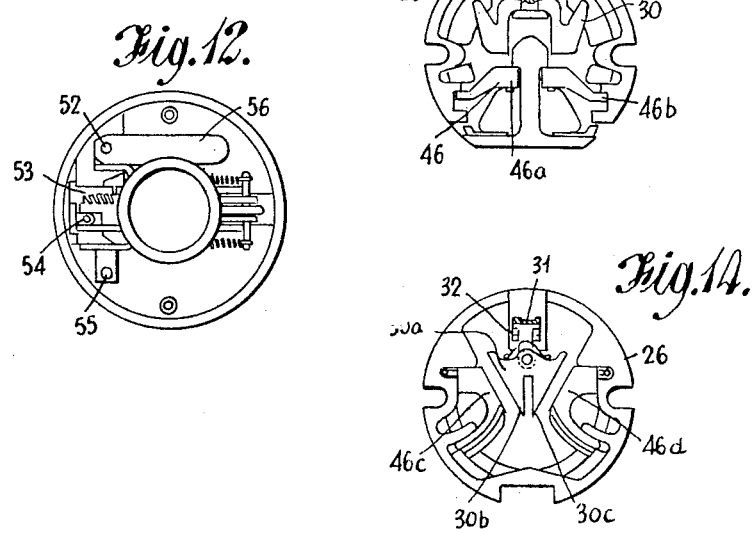

Уnited States Patent Office 2,753,423
Patented July 3, 1956

2,753,423
ARC SUPPRESSORS FOR ELECTRIC SWITCHGEAR

René Eugené Hairy, Bois-Colombes, France
Application March 25, 1952, Serial No. 278,370
Claims priority, application France March 28, 1951
16 Claims. (Cl. 200—144)

The present invention relates to means for suppressing arcs in electric switchgear and has for its object improvements in such means.

It has previously been proposed to suppress the arcs arising in electric switchgear by placing resistances in series with the terminals of the apparatus so that terminal voltages are suppressed to an extent to oppose the tendency for arcs to strike upon breaking the contact between a fixed and a movable contact. Such arrangements however have utilised conventional resistances inserted individually at will under the control of an operator. Therefore, such arrangements have not operated automatically to produce automatic suppression of the tendency for arcs to strike: they have merely reduced the terminal voltages after the arc has struck, by a manual operation. In at least one prior arrangement the separate resistances were in the form of the teeth of a comb switched successively into circuit under the control of the operator. In at least one other prior arrangement the resistances were arranged on a plurality of carbon discs also successively switched.

According to the present invention there is provided electric switch apparatus comprising an arc-suppression chamber having arc horns for extending the arc on striking, in which the active surfaces of the arc horns consist at least in part of semi-conducting material as herein defined.

For the purposes of this invention the definition of a semi-conducting material is a material whose resistance is sufficiently high that it cannot be classified as a normal conductor yet not so high that it can be classified as an insulator. In extension of this definition, it is pointed out that the resistivity of varying materials between conductors and insulators may be regarded to fall within the following values.

Conductors from 1 to 5 micro ohms per cm.
Conventional resistors from 5 to 150 micro ohms per cm.
Semi-conductors from 200 to 100,000 micro ohms per cm.
Insulators above 100,000 micro ohms per cm.

Examples of such materials are sintered metals or metal oxides used by themselves or in mixtures: they may also be sintered with insulating materials such as silica, or magnesia, or with carbon and the cyanised derivatives thereof for example. Alternatively they may consist of pure semi-conducting materials for example germanium, boron, silicon, selenium, or tellurium.

The expression "sintered" means caused to become or having become a coherent solid mass by heating without thoroughly melting.

The principal characteristic of such semi-conducting materials so far as the purposes of the present invention are concerned is that their electrical resistance decreases either when the voltage applied to them increases or when the operating temperature increases; in the former case they are often referred to as "varistors" and in the latter case as "thermistors" although generally, the whole class of these materials come under the group classification of "semi-conductors." Therefore it should be understood that the use of any one of these generic terms hereinafter is intended to embrace all of them as occasion or convenience dictates.

It is also of interest to note that the insulating materials mentioned above are sometimes known in France as "ceramales," "cerameles," "cérémales" or "cérémèles," the spelling being variable.

The semi-conducting material may be in the form of a wire or wires connected to the terminals of the suppression chamber or it may be in the form of a massive body connected to or incorporating the terminals, or alternatively it may be in the form of a comb whose teeth are connected to the terminals of the suppression chamber by a common connecting member. Preferably the arcing space is subdivided by one or more strips of semi-conducting material.

In order that the invention may be more fully understood, reference will now be made to the accompanying drawings which show a number of embodiments thereof by way of non-limiting example and in which:

Fig. 1 shows a top plan section along the line I—I of Fig. 2 of a switch incorporating a first embodiment of an arc-suppression chamber according to the invention.

Fig. 2 shows a section along the line II—II of Fig. 1,

Fig. 3 shows a section along the line III—III of Fig. 1, but rotated 90° counter-clockwise omitting the moving contact.

Fig. 4 shows a top plan section along the line IV—IV of Fig. 5 of a switch incorporating a second embodiment of an arc-suppression chamber, Fig. 5 shows a section along the line V—V of Fig. 4, but rotated 90° counter-clockwise.

Fig. 6 shows a section along the line VI—VI of Fig. 4,

Fig. 7 shows a top plan section along the line VII—VII of Fig. 8 of a switch incorporating a third embodiment of an arc-suppression chamber.

Fig. 8 shows a section along the line VIII—VIII of Fig. 7,

Fig. 9 show a section along the line IX—IX of Fig. 7, omitting the moving contact 20.

Fig. 10 shows a side elevation of another embodiment of a switch according to the invention with a side cover removed and in the closed position, partly in section.

Fig. 11 shows the switch of Fig. 11 partly in section, but in the disengaged position, Fig. 12 shows a plan view of the switch of Figs. 10 and 11 with the top cover removed, Fig. 13 shows one form of arc-suppression chamber suitable for use with the switch of Figs. 10 to 12, and Fig. 14 shows another form of suppression chamber suitable for use with the same switch.

Referring to the drawings, and more particularly to Figs. 1 to 3, 1, 2 and 3 represent three semi-conducting strips which are located in the space 7 within which arcs tend to strike in the suppression chamber 4. The latter is made from poreclain, steatite or any insulating material which is resistant to flame to render the arrangement completely safe in the event of an arc striking when the moving contact 10 is withdrawn from the fixed contacts 9. Although three strips are shown, it will be understood that more or less than this number may be used if desired.

The chamber is in two parts held together by the members 6 which may be screws or the like. The space 7 is in the form of a conduit or pipe to facilitate the drawing out of the arc and allow air to circulate for cooling purposes, thus to bring about de-ionisation in said space.

The fixed contacts 9 are copper blocks and 8 are inlet and outlet terminals by which the switch is connected in circuit.

The arc horns according to the invention are shown at 5 and in this embodiment they are in the form of wires or filaments. When the contact 10 is separated from the contacts 9, the disposition of the parts causes an arc to strike between the contacts 9 and the moving contact 10 but owing to the presence of the strips 1, 2 and 3, and the resistance wires 5 and the shape of the space 7, the extent of the arc in the space 7 is minimised thus bringing about an automatic reduction of voltage between the fixed contacts 9 and automatic suppression of the arc.

In conformity with conventional practice, the suppression chamber also incorporates electro-magnetic blow-out means which are adapted to establish a magnetic field whose maximum density occurs along the axis of the chamber. The magnetic poles, which are not shown per se, are housed in housings 13.

Referring now to Figs. 4, 5 and 6, in which like reference numerals refer to like parts, the chamber 4' also contains intermediate strips 1, 2, 3 as in Figs. 1 to 3 but the arc horns forming resistances to be placed in series with the arc consist of massive blocks 14 of semiconducting material secured to the material of the chamber 4' which, again, is of material such as porcelain, steatite or the like.

In both embodiments, the moving contact 10 is operated by the handle member 12 and in the position of engagement, the ends of the strips 1, 2 and 3 are housed in the housing 11 in the contact 10.

Referring now to Figs. 7, 8 and 9, in which also like references refer to like parts, the suppression chamber itself is designated 4'' and is of porcelain, steatite, or the like as previously. In this embodiment, the resistances of semi-conducting material are in the form of combs 15, whose tips form the active surfaces of the arc horns and the individual teeth of which are connected by a connection member 16 also of semi-conducting material for connection to the fixed contacts 9. The two outer intermediate strips of semi-conducting material are shorter than those of the preceding Figures 1 to 6 and are designated 17 and 19, the centre one, 18 being of the same length as previously. This embodiment therefore shows that the strips need not necessarily extend the whole length of the space 7 since it has been found that their presence is nearly as efficacious if the arc is struck and meets them some distance from its inception. The space 7 may, in certain circumstances be cylindrical.

The moving contact is shown at 20 and has an aperture 21 to house the end of the strip 18, a central bore 22 and a tube 23. The latter member is adapted to supply a jet of fluid, particularly air, for aiding in the extinction of the arc and is also used for operating the contact 20. Reference 24 represents a magnetic blow-out winding which may be used also for arc-extinction as previously.

In this embodiment, the difference in potential between the extremities of the two opposed teeth between which the arc is commenced is very much higher than that existing between the following two teeth, owing to the dissipation of the arc and the resistance of the teeth and connecting members 16. As a consequence the arc has a tendency to strike between these last two teeth and so on step by step, so that it is displaced in the correct sense for its extinction.

If desired, the extremities of the teeth may be pointed.

Referring now to Figs. 10 to 12, a switch comprises a base of insulating material, such as porcelain, steatite or the like within which is contained an electromagnetic coil 25 functioning for the two purposes of blowing out the arc and as a tripping relay. Above this member is an arc-suppression chamber 26. Circuit connections are made by way of external screwed contact 27 and internal contact 28 insulated from the contact 27 by the material 29.

The moving contact 30 is operated by a bellcrank lever 31 with which it is connected by the pin 32. The lever 31 is journalled in the walls 33 of the casing at 34.

Contained in the upper part of the casing is an operating member 35 journalled at 36 in the walls of the casing 33. The member 35 has a slot 37 and co-operating within the slot is a catch 38 having a pin 39 riding in the slot.

An electromagnetic tripping hammer is provided at 40 which is journalled to the casing at 41. The hammer 40 has an extension 42 which bears against the catch 38 in the engaged position as shown in Fig. 10. To complete the electromagnetic circuit for arc extinction there is provided a metal member 43, and 44 represents the adjustable gap for the hammer 40.

The switch is caused to close to the position shown in Fig. 10 upon pressure on the button 45 which bears by its lower extremity 45a on the catch 38 to move the pin 39 down the slot 37 in the member 35, the lower extremity of which has a nose 49 resting against a blade 50, the end of catch 38, which engages over a roller 31a, thereby pushing the lever 41 in a clockwise direction to the position shown in Fig. 10, against the action of a spring which is mounted about lever shaft 34 behind said lever, and bears against a suitable fixed part of the case. This spring cannot, therefore, be seen in the drawings but its function and position are considered to be sufficiently self-evident not to need especial illustration. It is similar in appearance and action to springs 35a and 48. Such a clockwise movement causes the lower end of lever 31 to push the moving contact 30 towards a fixed contact 46 in the chamber 26 to make the circuit. A return spring 47 is provided for the button 45, and a return spring 35a operates on the member 35 to give the catch 38 an initial position bearing on roller 31a in the "off" position whether the switch be arranged vertically or horizontally.

To open the circuit a magnetic field may be established in the coil 25; this attracts the hammer 40 which moves in a counter-clockwise direction viewed in the drawings, about its pivot 41 whereby the extension 42 exerts pressure on the catch 38 so that the pin 39 rides up slot 37 and the shoulder 38a is raised out of the path of the roller 31a whereby the lever 31 moves counter-clockwise under the action of its spring previously referred to thus to move the moving contact 30 away. A return spring 48 is provided for the hammer 40 to return it to its initial position as shown in the drawings.

Alternatively, the circuit may be opened by thermo-electric means. The blade 50 mentioned above is integral with a bimetallic strip 56 (Fig. 12) and when the blade 50 is caused to move downwards under thermo-electric action the nose 49 is freed and moves to the left of the drawing to effect release of shoulder 38a from roller 31a.

As yet a further alternative, a button diagrammatically shown at 51 is provided for manual operation on the hammer 40.

Figs. 13 and 14 show two forms of arc-suppression chamber that may be used in this embodiment of the invention. In Fig. 13, the moving contact 30 is of horseshoe shape connected to the lever 31 at pin 32. The fixed contact 46 comprises two arms 46a and 46b as shown. In Fig. 14 the moving contact 30a is triangular and the fixed contacts 46c, 46d shaped to receive it. The length of contact 30a is such that the arc is divided at opening of the contacts and the portions are displaced by the points 30b, 30c under the influence of the magnetic field thereby causing extension of the arc and its consequent suppression. All the arc horns 46a, 46b, 46c and 46d are made from sintered metals or other semi-conducting materials as hereinbefore explained.

Certain adjustments are provided for the switch of this embodiment and in Fig. 12, 52 shows an adjusting screw for the bimetal strip, 53 a slotted plate the edges of the slots being turned up to form a grille so that the end of the spring 48 may be selectively placed in any one of the openings to obtain adjustment of its strength, and 54 an adjusting screw for the mechanism 35, 50.

Re-engagement by button 45 in the event of short-circuit or overload is prevented by means of the members 59 and 40. The former, which will have moved down, no longer prevents the member 35 turning about the axis 36 when the pin 39 of catch 38 rides down in the slot 37 so that no pressure is exerted on roller 31a and there is no movement of the bellcrank lever 31. Secondly, the hammer 40 raises the said catch 38 by extension 42 and also prevents engagement of shoulder 38a over the roller 31a of the bellcrank lever 31.

I claim:

1. Electric switch apparatus comprising an arc-suppression chamber having arc horns for extending the arc on striking, in which the active surfaces of the arc horns consist at least in part of semi-conducting material as herein defined.

2. Electric switch apparatus comprising an arc-suppression chamber having arc horns for extending the arc on striking, in which the active surface of each arc horn comprises a filamentary body of a semi-conducting material as herein defined, and a plurality of terminals in said suppression chamber, each of said filamentary bodies being connected to one of said terminals.

3. Electric switch apparatus comprising an arc-suppression chamber, a plurality of massive bodies of a semi-conducting material as herein defined mounted within said chamber, one edge of each of said massive bodies comprising an arc horn for extending the arc on striking, and a plurality of terminals in said suppression chamber, each of said massive bodies being connected to one of said terminals.

4. Electric switch apparatus comprising an arc-suppression chamber having arc horns for extending the arc on striking, a pair of combs each comprising a plurality of blades of a semi-conducting material as herein defined arranged transversely to the axis of said suppression chamber and joined together by one of their ends, flame-resistant insulating material located between the said blades of said combs, said arc horns comprising the tips of the free ends of said blades, a pair of terminals in said suppression chamber, and means for connecting the said blades of each of said combs to one of said terminals.

5. Electric switch apparatus comprising an arc-suppression chamber having arc horns for extending the arc on striking, a pair of combs each comprising a plurality of blades of a semi-conducting material as herein defined arranged transversely to the axis of said suppression chamber and joined together by one of their ends by a common connecting member, flame-resistant insulating material located between the said blades of said combs, said arc horns comprising the tips of the free ends of said blades, and a pair of terminals in said suppression chamber, each of said common connecting members being composed of a semi-conducting material as herein defined and being connected to one of said terminals.

6. Electric switch apparatus comprising an arc-suppression chamber having arc horns for extending the arc on striking and an arcing space between said arc horns, in which the active surfaces of the arc horns consist at least in part of semi-conducting material as herein defined, and in which said arcing space is longitudinally subdivided by at least one strip of a semi-conducting material as herein defined.

7. Electric switch apparatus comprising an arc-suppression chamber, arc horns in said chamber for extending the arc on striking, an arcing space between said arc horns, the active surface of each arc horn comprising a filamentary body of a semi-conducting material as herein defined, a plurality of terminals in said suppression chamber, each of said filamentary bodies being connected to one of said terminals, and at least one strip of a semi-conducting material as herein defined longitudinally subdividing said arcing space.

8. Electric switch apparatus comprising an arc-suppression chamber, arc horns in said chamber for extending the arc on striking, an arcing space between said arc horns, a plurality of massive bodies of a semi-conducting material as herein defined mounted within said chamber, each of said arc horns comprising an edge of one of said massive bodies, a plurality of terminals in said suppression chamber, each of said massive bodies being connected to one of said terminals, and at least one strip of a semi-conducting material as herein defined longitudinally subdividing said arcing space.

9. Electric switch apparatus comprising an arc-suppression chamber, arc horns in said chamber for extending the arc on striking, an arcing space between said arc horns, a pair of combs each comprising a plurality of blades of a semi-conducting material as herein defined arranged transversely to the axis of said suppression chamber and joined together by one of their ends, flame-resistant insulating material located between the said blades of said combs, said arc horns comprising the tips of the free ends of said blades, a pair of terminals in said suppression chamber, means for connecting the said blades of each of said combs to one of said terminals, and at least one strip of a semi-conducting material as herein defined longitudinally subdividing said arcing space.

10. Electric switch apparatus comprising an arc-suppression chamber having arc horns for extending the arc on striking, in which the active surfaces of said arc horns consist at least in part of sintered metals.

11. Electric switch apparatus comprising an arc-suppression chamber having arc horns for extending the arc on striking, in which the active surfaces of said arc horns consist at least in part of sintered metal oxides.

12. Electric switch apparatus comprising an arc-suppression chamber having arc horns for extending the arc on striking, in which the active surfaces of said arc horns consist at least in part of metals sintered with insulating material.

13. Electric switch apparatus comprising an arc-suppression chamber having arc horns for extending the arc on striking, in which the active surfaces of said arc horns consist at least in part of metal oxides sintered with insulating material.

14. Electric switch apparatus comprising an arc-suppression chamber having arc horns for extending the arc on striking, in which the active surfaces of the arc horns consist at least in part of a pure semi-conducting material chosen from the group germanium, boron, silicon, selenium and tellurium.

15. Electric switch apparatus comprising an arc-suppression chamber having arc horns for extending the arc on striking, in which the active surfaces of said arc horns consist at least in part of metals sintered with one of the materials silica and magnesia.

16. Electric switch apparatus comprising an arc-suppression chamber having arc horns for extending the arc on striking, in which the active surfaces of said arc horns consist at least in part of metal oxides sintered with at least one of the materials silica and magnesia.

References Cited in the file of this patent

UNITED STATES PATENTS

| Number | Name | Date |
|---|---|---|
| 1,300,367 | Fortescue | Apr. 15, 1919 |
| 1,563,833 | Christensen | Dec. 1, 1925 |
| 1,861,129 | Milliken | May 31, 1932 |
| 2,141,749 | Hauser | Dec. 27, 1938 |
| 2,178,508 | Zickrick | Oct. 31, 1939 |
| 2,200,125 | Slepian | May 7, 1940 |
| 2,227,446 | Driggs et al. | Jan. 7, 1941 |
| 2,387,614 | Savage | Oct. 23, 1945 |
| 2,528,118 | Crabbs | Oct. 31, 1950 |
| 2,556,197 | Krieger | June 12, 1951 |
| 2,590,543 | Kalaway | Mar. 25, 1952 |
| 2,596,865 | Peter | May 13, 1952 |
| 2,599,657 | Pavitt | June 10, 1952 |
| 2,629,036 | Brown | Feb. 17, 1953 |
| 2,636,012 | Christensen | Apr. 21, 1953 |
| 2,645,700 | Morin | July 14, 1953 |